United States Patent
Fujii et al.

(10) Patent No.: US 6,265,472 B1
(45) Date of Patent: Jul. 24, 2001

(54) BLACK COLORED REINFORCED POLYAMIDE RESIN COMPOSITION

(75) Inventors: Osamu Fujii; Katuya Nishiobino, both of Miyazaki (JP)

(73) Assignee: Asahi Kasei Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/320,280

(22) Filed: Jun. 2, 1999

(30) Foreign Application Priority Data

Jun. 2, 1998 (JP) .................................................. 10-167794

(51) Int. Cl.$^7$ ................................................. C08K 5/3467
(52) U.S. Cl. ........................... 524/88; 252/502; 252/510; 524/447; 524/449; 524/451; 524/456; 524/538
(58) Field of Search ............................... 524/88; 252/502, 252/510

(56) References Cited

U.S. PATENT DOCUMENTS

| | | | |
|---|---|---|---|
| 4,118,364 | 10/1978 | Nielinger et al. | 260/37 N |
| 4,518,728 | 5/1985 | Pollard | 524/88 |
| 5,371,132 | 12/1994 | Ebara et al. | 524/413 |
| 5,405,890 | * 4/1995 | Baierweck et al. | 524/88 |

FOREIGN PATENT DOCUMENTS

| | | |
|---|---|---|
| 52944A1 | 6/1982 | (EP) . |
| 53-51251A | 5/1978 | (JP) . |
| 60-43379B2 | 9/1985 | (JP) . |
| 43-70148A | 12/1992 | (JP) . |
| 67-3288A | 3/1994 | (JP) . |
| 63-5540B2 | 5/1994 | (JP) . |
| 63-5541B2 | 5/1994 | (JP) . |

* cited by examiner

Primary Examiner—Ana Woodward
(74) Attorney, Agent, or Firm—Birch, Stewart, Kolasch & Birch, LLP

(57) ABSTRACT

A black colored reinforced polyamide resin composition which comprises the following components (A) to (D): (A) a polyamide; (B) at least one inorganic filler selected from glass fiber, mica, talc, kaolin and wollastonite; (C) a carbon black; and (D) at least one copper-phthalocyanine derivative represented by the following general formula (I) and (II):

$$CuPc\text{-}(\text{---}X\text{---}NR_1R_2)_n \qquad (I)$$

$$CuPc\text{-}(\text{---}SO_2\text{---}NR_3R_4)_n \qquad (II)$$

wherein CuPc represents a substituted or unsubstituted copper-phthalocyanine residue, X represents —$CH_2$—, —$CH_2$—$CH_2$—COO—$C_2H_4$— or —$CH_2$—$CH_2$—COO—$C_3H_6$—, $R_1$, $R_2$ and $R_3$ each independently represents a hydrogen atom, an unsubstituted alkyl group, a substituted alkyl group, a cycloalkyl group, an alkylaryl group, an aryl group, an alkoxyalkyl group or a heterocyclic residue, $R_4$ represents an alkylaryl group, an aryl group, an alkoxyalkyl group or a heterocyclic residue, wherein $R_1$ and $R_2$ or $R_3$ and $R_4$ may be bonded to each other to form a substituted or unsubstituted heterocyclic ring, and n is from 1 to 4 on the average, wherein the composition contains: from 30 to 70 parts by weight of (A); from 70 to 30 parts by weight of (B); from 0.05 to 10 parts by weight of (C) based on 100 parts by weight of the total weight of (A) and (B); and from 5 to 100 parts by weight of (D) based on 100 parts by weight of (C).

11 Claims, No Drawings

BLACK COLORED REINFORCED POLYAMIDE RESIN COMPOSITION

FIELD OF THE INVENTION

This invention relates to a black colored reinforced polyamide resin composition which renders possible production of molding articles that show excellent initial appearance (surface gloss), have mechanical properties substitutive for metals and hardly cause fading of black color under working conditions in the field, particularly where they are exposed to rain.

BACKGROUND OF THE INVENTION

Since polyamide resins have excellent mechanical and thermal properties and oil resistance, they are broadly used in various parts of, for example, automobiles and electric and electronic products. Also, since reinforced polyamide resins in which the polyamide is blended with an inorganic filler such as glass fiber show remarkably improved properties such as mechanical characteristics, heat resistance and chemical resistance, it becomes possible to use them as substitutes for certain parts conventionally made of metals, for the reasons, for example, of the weight reduction of products and rationalization of production steps, so that such resins have been positively studied in recent years.

Particularly, they are frequently used in the form of black colored molding articles in the case of their use in outdoor applications. Because of this, blending of carbon black is employed as a means to obtain black colored molding articles most inexpensively while easily improving weather resistance.

However, it is known that compositions prepared by merely blending polyamide with carbon black have many problems.

For example, it has been reported that certain problems such as reduction in toughness could occur in products obtained from a composition in which polyamide containing no inorganic filler was blended with carbon black. As a means for solving such problems, several techniques in which a specific dyestuff is jointly used with carbon black have been disclosed. For example, a composition for molding use in which a polyamide resin is blended with carbon black and nigrosine (JP-B-60-43379; the term "JP-B" as used herein means an "examined Japanese patent publication) and a method in which a thermoplastic resin containing nylon is colored by blending it with carbon black and a specific copper-phthalocyanine dyestuff (JP-B-6-35540, JP-B-6-35541) have been reported.

However, these disclosed techniques do not suggest or disclose about a method for improving surface appearance of molding articles when an inorganic filler is blended, or a method for inhibiting fading of black color in rain-accompanying weather resistance test. These problems concerning appearance and weather resistance occur in many cases, particularly when polyamide contains an inorganic filler in a relatively high concentration.

On the other hand, it has been reported that certain problems such as remarkably reduced surface gloss of produced molding articles occur when polyamide containing an inorganic filler is blended with carbon black. As a means for resolving such problems, the use of a resin composition in which polyamide containing glass fiber and carbon black is further blended with nigrosine has been disclosed (JP-A-4-370148; the term "JP-A" as used herein means an "unexamined published Japanese patent application").

However, according to the studies carried out by the inventors of the present invention, countless cracks were formed on the surface of molding articles when these molding articles were obtained by the disclosed method and subjected to rain-accompanying weather resistance test. In addition, exposure of glass fibers to the surface was marked particularly when the glass fiber content was relatively high, so that their use in the field could cause serious problems.

As described above, the conventional techniques do not suggest or disclose a black colored reinforced polyamide resin composition having such properties that molding articles obtained therefrom show excellent surface appearance, have mechanical characteristics substitutive for metals and hardly cause fading of black color under working conditions in the field, particularly where they are exposed to rain.

SUMMARY OF THE INVENTION

It is, therefore, an object of the present invention to provide a black colored reinforced polyamide resin composition which can be made into molding articles that hardly cause fading of black color under working conditions in the field, particularly where they are exposed to rain, and also have excellent appearances.

Other objects and effects of the present invention will become apparent from the following description.

In order to accomplish the above-described objects, the present inventors made extensive studies. As a result, the inventors found that a black colored reinforced polyamide resin composition which renders possible production of molding articles that hardly cause fading of black color under working conditions in the field, particularly where they are exposed to rain, and also have excellent appearances, can be obtained by black-coloring an inorganic filler-reinforced polyamide resin through blending with specific amounts of carbon black and a specific copper-phthalocyanine derivative. The present invention has been accomplished on the basis of this finding.

That is, the above-described objectives of the present invention have been achieved by providing the following black colored reinforced polyamide resin compositions.

1) A black colored reinforced polyamide resin composition which comprises the following components (A) to (D):
(A) a polyamide;
(B) at least one inorganic filler selected from glass fiber, mica, talc, kaolin and wollastonite;
(C) a carbon black; and
(D) at least one copper-phthalocyanine derivative represented by the following general formula (I) and (II):

  (I)

  (II)

wherein CuPc represents a substituted or unsubstituted copper-phthalocyanine residue, X represents —CH$_2$—, —CH$_2$—CH$_2$—, COO—C$_2$H$_4$— or —CH$_2$—CH$_2$—COO—C$_3$H$_6$—, R$_1$, R$_2$ and R$_3$ each independently represents a hydrogen atom, an unsubstituted alkyl group, a substituted alkyl group, a cycloalkyl group, an alkylaryl group, an aryl group, an alkoxyalkyl group or a heterocyclic residue, R$_4$ represents an alkylaryl group, an aryl group, an alkoxyalkyl group or a heterocyclic residue, wherein R$_1$ and R$_2$ or R$_3$ and R$_4$ may be bonded to each other to form a substituted or unsubstituted heterocyclic ring, and n is from 1 to 4 on the average, wherein the composition contains: from 30 to 70 parts by weight of (A); from 70 to 30 parts by weight of (B); from 0.05 to 10 parts by weight of (C) based on 100 parts by weight of the total weight of (A) and (B); and from 5 to 100 parts by weight of (D) based on 100 parts by weight of (C).

2) The black colored reinforced polyamide resin composition according to the above 1), wherein the blending amount of the copper-phthalocyanine derivative (D) is from 0.1 to 8 parts by weight based on 100 parts by weight of the inorganic filler (B).

3) The black colored reinforced polyamide resin composition according to the above 1), wherein the polyamide (A) is a polyamide which comprises:

(a1) from 85 to 100% by weight of a semi-aromatic polyamide having a crystallization temperature of not higher than 210° C. and containing an aromatic ring in its monomer constituting unit; and (a2) from 0 to 15% by weight of an aliphatic polyamide having a crystallization temperature of not higher than 210° C.

4) The black colored reinforced polyamide resin composition according to the above 3), wherein the polyamide (a1) is a semi-aromatic polyamide comprises:

from 70 to 95% by weight of a hexamethylene adipamide unit obtained from adipic acid and hexamethylenediamine; and from 5 to 30% by weight of a hexamethylene isophthalamide unit obtained from isophthalic acid and hexamethylenediamine.

5) The black colored reinforced polyamide resin composition according to the above 1), wherein component (B) is glass fiber having an average fiber diameter of from 15 to 30 μm.

6) The black colored reinforced polyamide resin composition according to the above 1), further containing at least one of:

a copper compound other than the copper-phthalocyanine derivative in an amount of from 10 to 1,000 ppm in terms of copper atoms; and a phosphite compound in an amount of from 10 to 10,000 ppm, each based on the polyamide (A).

DETAILED DESCRIPTION OF THE INVENTION

Though not particularly limited, examples of the polyamide (A) for use in the present invention include a homopolymer alone, a copolymer alone, a mixture of homopolymers, a mixture of copolymers and a mixture of copolymer and homopolymer, which are obtained by optional combinations of nylon-forming monomers such as ε-caprolactam, adipic acid, sebacic acid, dodecanoic diacid, isophthalic acid, terephthalic acid, hexamethylenediamine, tetramethylenediamine, 2-methylpentamethylenediamine, 2,2,4-trimethylhexamethylenediamine, 2,4,4-trimethylhexamethylenediamine, metaxylylenediamine and bis(3-methyl-4-aminocyclohexyl)methane. Specific examples of such polyamide resins include homopolymers such as nylon 6, nylon 66, nylon 46, nylon 610, nylon 612, nylon 11, nylon 12, nylon mXD6, a nylon obtained by polymerizing hexamethylenediamine with isophthalic acid (nylon 6I) and a nylon obtained by polymerizing isophthalic acid with bis (3-methyl-4-aminocyclohexyl) methane (nylon PACMI) and copolymers such as a nylon obtained by polymerizing adipic acid with isophthalic acid and hexamethylenediamine (nylon 66/6I copolymer), a nylon obtained by polymerizing adipic acid with terephthalic acid and hexamethylenediamine (nylon 66/6T copolymer), a nylon obtained by polymerizing isophthalic acid with terephthalic acid and hexamethylenediamine (nylon 6I/6T copolymer), a nylon obtained by polymerizing terephthalic acid with 2,2,4-trimethylhexamethylenediamine and 2,4,4-trimethylhexamethylenediamine (nylon TMDT copolymer) and a copolymer nylon obtained by polymerizing isophthalic acid with terephthalic acid, hexamethylenediamine and bis (3-methyl-4-aminocyclohexyl)methane, as well as a mixture of a copolymer nylon obtained by polymerizing isophthalic acid with terephthalic acid, hexamethylenediamine and bis (3-methyl-4-aminocyclohexyl)methane with nylon 6 and a mixture of MXD6 nylon with nylon 66.

More preferably, the polyamide (A) is a polyamide which comprises (a1) 85 to 100% by weight of a semi-aromatic polyamide having a crystallization temperature of 210° C. or less and containing an aromatic ring in its monomer constituting unit and (a2) 0 to 15% by weight of an aliphatic polyamide having a crystallization temperature of 210° C. or less but not containing an aromatic ring in its monomer constituting unit. That is, the polyamide (A) may be a semi-aromatic polyamide (a1) having a crystallization temperature of 210° C. or less and containing an aromatic ring in its monomer constituting unit, alone, or a polyamide mixture consisting of 85% by weight or more and less than 100%by weight of the semi-aromatic polyamide (a1) and more than 0% to 15% by weight or less of an aliphatic polyamide (b1) having a crystallization temperature of 210° C. or less but not containing an aromatic ring in its monomer constituting unit. When the polyamide is used, molding articles having more excellent appearances can be obtained, particularly in the case of higher blending amount of the inorganic filler. When the crystallization temperature of one or both of the semi-aromatic polyamide (a1) and aliphatic polyamide (b1) for use in the present invention exceeds 210° C., molding articles having proper appearances may not be obtained in some cases, because the inorganic filler is exposed to the surface of the obtained molding articles depending on the shape and molding conditions of the molding articles. The crystallization temperature of the polyamide for use in the present invention is a crystallization peak top temperature measured at a cooling temperature rate of 20° C./minute after keeping a sample at a temperature of melting point plus 30° C., in accordance with the procedure of Japanese Industrial Standard (JIS) K 7121 using DSC.

The semi-aromatic polyamide (a1) having a crystallization temperature of 210° C. or less and containing an aromatic ring in its monomer constituting unit is described in more detail below.

Examples of the semi-aromatic polyamide having a crystallization temperature of 210° C. or less and containing an aromatic ring in its monomer constituting unit include a semi-aromatic polyamide which contains at least one component selected from a hexamethylene terephthalamide unit obtained from terephthalic acid and hexamethylenediamine (to be referred to as "6T component" hereinafter), a hexamethylene isophthalamide unit obtained from isophthalic acid and hexamethylenediamine (to be referred to as "6I component" hereinafter) and a metaxylylene adipamide unit obtained from adipic acid and metaxylylenediamine (to be referred to as "MXD component" hereinafter), and a copolymer of at least one component selected from the above-described 6T component, 6I component and MXD component with a hexamethylene adipamide unit obtained from adipic acid and hexamethylenediamine (to be referred to as "66 component" hereinafter), and it may be a homopolymer of each unit and/or a blend with a copolymer.

Particularly preferred semi-aromatic polyamide (a1) for use in the present invention is a polyamide 66/6I copolymer having the 66 component within the range of from 70 to 95% by weight and the 6I component within the range of from 5 to 30% by weight, more preferably a copolymer having the 66 component within the range of from 72 to 93% by weight and the 6I component within the range of from 7 to 28% by weight. When the6I component is smaller than 5% by weight, strength and rigidity are reduced in practical use after water absorption, and the molding shrinkage ratio at the time of molding becomes large, causing problems such as warpage. This problem becomes particularly serious in larger molding articles, because the whole body of each of such molding articles is considerably warped by a slight difference of the molding shrinkage ratio in the resin. When the 6I component is larger than 30% by weight, and when molding is carried out using a mold having a water-controlled temperature of 100° C. or less, the inorganic filler is apt to come up to the surface of molding articles so that molding articles having sufficiently satisfactory surface gloss cannot be obtained in some cases. In addition, such molding articles cannot be released from the mold when sufficient cooling time inside the mold is not taken, which may cause poor productivity.

Next, the aliphatic polyamide (a2) having a crystallization temperature of 210° C. or less is described. Examples of such polyamide include polyamide 6, polyamide 610, polyamide 612, polyamide 11, polyamide 12, a polyamide 66/6 copolymer and a blend thereof.

The above-described aliphatic polyamide (a2) can be added to the polyamide (A) for use in the present invention, in an amount of from 0% by weight to 15% by weight. The amount exceeding 15% by weight is not desirable, because it causes reduced mechanical properties of the resulting molding articles and decreased rain-accompanying weather resistance which entails considerable fading of black color.

Regarding the method for producing the polyamide for use in the present invention, it can be produced for example from adipic acid, isophthalic acid and a salt of hexamethylenediamine by various condensation polymerization methods such as melt polymerization, solid-state polymerization, bulk polymerization, solution polymerization and a combination method thereof. It also can be produced from adipic acid chloride, isophthalic acid chloride and hexamethylenediamine by various polymerization methods such as solution polymerization and interfacial polymerization. Among these methods, melt polymerization or a combination of melt polymerization with solid-state polymerization is desirable from the economical point of view.

Molecular weight of the polyamide for use in the present invention is from 1.5 to 3.5, preferably from 1.8 to 3.0, more preferably from 2.0 to 2.8, as a sulfuric acid solution viscosity $\eta r$ (measured with 100 ml of 95.5% sulfuric acid per 1 g of the polymer at 25° C). When the $\eta r$ value is smaller than 1.5, the resin composition becomes brittle, and drooling from the nozzle tip of a cylinder becomes frequent at the time of molding which cannot therefore be carried out. Also, when the $\eta r$ value is larger than 3.5, melt viscosity of the resin becomes so high that the surface gloss is reduced due to partial exposure of the inorganic filler at the time of molding depending on the design of mold.

The polyamide (A) is blended within the range of from 30 to 70 parts by weight, preferably from 35 to 67 parts by weight. When the amount is smaller than 30 parts by weight, not only filling of the resin into thin wall becomes difficult due to reduced fluidity of the resin but also production of molding articles having proper surface gloss becomes difficult. Also, when the amount is larger than 70 parts by weight, strength and rigidity become insufficient for use in metal-substitutive exterior packages.

The inorganic filler (B) for use in the present invention is at least one inorganic filler selected from glass fiber, mica, talc, kaolin and wollastonite, which can be used in combination such as glass fiber and mica, glass fiber and kaolin or baked kaolin or glass fiber and wollastonite. Particularly desirable among them is glass fiber. The glass fiber maybe any of those usually used in thermoplastic resins, and the diameter and length of the fiber are not particularly limited. For example, any one of chopped strand, roving and milled fiber each having a diameter of from 5 to 30 $\mu$m can be used. When chopped strand is used, its length can be selected optionally within the range of from 0.1 to 6 mm.

Inorganic fillers, to the surface of which a usually known silane coupling agent is attached, may also be used. Examples of the useful coupling agent include $\gamma$-aminopropyl trimethoxysilane, $\gamma$-aminopropyl triethoxysilane, N-$\beta$-(aminoethyl)-$\gamma$-aminopropyl trimethoxysilane, vinyl triethoxysilane and $\gamma$-glycidoxypropyl trimethoxysilane. The inorganic filler is used in an amount of from 30 to 70 parts by weight, preferably from 33 to 65 parts by weight. When the amount is smaller than 30 parts by weight, strength and rigidity as a metal-substitutive material become insufficient. Also, when the amount is larger than 70 parts by weight, not only filling of the resin into thin wall becomes difficult due to reduced fluidity of the resin but also production of molding articles having proper surface gloss becomes difficult.

More preferred inorganic filler is glass fiber, and average fiber diameter of the glass fiber is from 15 to 30 $\mu$m. According to the present invention, the average glass fiber diameter is measured by extracting 300 to 1,000 glass fibers at random from pellets of the black colored reinforced polyamide resin composition and observing them under a light microscope, and number average fiber diameter is used as the average fiber diameter. When the glass fiber diameter is thinner than 15 $\mu$m, sufficient appearance and weather resistance may not be obtained depending on the use. When the glass fiber diameter is thicker than 30 $\mu$m, sufficient mechanical characteristics, particularly strength, may not be obtained.

Though the carbon black (C) for use in the present invention is not particularly limited, its useful examples include thermal black, channel black, acetylene black, ketjen black and furnace black. According to the present invention, carbon black is used in an amount of from 0.05 to 10 parts by weight, preferably from 0.1 to 5 parts by weight, based on 100 parts by weight in total of the components (A) and (B). The amount if smaller than 0.05 part by weight would bear no sufficient effect to improve weather resistance and if larger than 10 parts by weight would spoil strength and rigidity.

The copper-phthalocyanine derivative (D) for use in the present invention is a copper-phthalocyanine derivative represented by the following general formula (I) or (II).

$$CuPc\text{-}(-X-NR_1R_2)_n \tag{I}$$

$$CUPc\text{-}(-SO_2-NR_3R_4)_n \tag{II}$$

In the above formulae, CuPc is a substituted or unsubstituted copper-phthalocyanine residue, X is —CH$_2$—, —CH$_2$—CH$_2$—COO—C$_2$H$_4$— or —CH$_2$—CH$_2$—COO—C$_3$H$_6$—, R$_1$, R$_2$ and R$_3$ are each independently hydrogen atom, an unsubstituted alkyl group, a substituted alkyl group, a cycloalkyl group, an alkylaryl group, an aryl group, an alkoxyalkyl group or a heterocyclic residue, $R_4$ is an alkylaryl group, an aryl group, an alkoxyalkyl group or a heterocyclic residue, wherein $R_1$ and $R_2$ or $R_3$ and $R_4$ may be bonded to each other to form a substituted or unsubstituted heterocyclic ring, and n is 1 to 4 (average value).

Examples of the copper-phthalocyanine derivative for use in the present invention include an (alkyl)phthalimidemethyl copper-phthalocyanine, a dialkylaminomethyl copper-phthalocyanine, an (alkyl)anilinosulfamoyl copper-phthalocyanine and a dialkylaminopropylsulfonamide copper-phthalocyanine. In view of the appearances of molding articles, copper-phthalocyanine sulfonamide derivatives such as an (alkyl) anilinosulfamoyl copper-phthalocyanine, an alkoxypropylsulfonamide copper-phthalocyanine and a dialkylaminopropylsulfonamide copper-phthalocyanine are particularly preferred.

Regarding the production method of the copper-phthalocyanine derivative for use in the present invention, it can be produced by generally known methods using copper-phthalocyanine substituted with a substituent such as chlorine atom, bromine atom or sulfone group or unsubstituted copper-phthalocyanine. For example, sulfonamide-substituted copper-phthalocyanine can be obtained by a known method by dissolving copper-phthalocyanine in chlorosulfonic acid, treating it with thionyl chloride and then allowing the thus formed copper-phthalocyanine sulfochloride to react with various amines.

According to the present invention, the copper-phthalocyanine derivative (D) is used in an amount of from 5 to 100 parts by weight, preferably from 10 to 50 parts by weight, based on 100 parts by weight of the carbon black (C). When the amount of copper-phthalocyanine derivative is smaller than 5 parts by weight based on carbon black, the inorganic filler is exposed to the surface of molding articles, and fading by outdoor exposure becomes significant. Also, the amount of copper-phthalocyanine derivative exceeding 100 parts by weight is not economical, because the weather resistance does not increase proportionally.

More preferred amount of the copper-phthalocyanine derivative is from 5 to 100 parts by weight based on 100 parts by weight of the carbon black (C) and also from 0.1 to 8 parts by weight based on 100 parts by weight of the inorganic filler (B). When the amount of copper-phthalocyanine derivative is smaller than 0.1 part by weight based on 100 parts by weight of the inorganic filler, the inorganic filler is exposed to the surface of molding articles, and fading by outdoor exposure becomes significant in some cases. Also, the amount of copper-phthalocyanine derivative exceeding 8 parts by weight based on 100 parts by weight of the inorganic filler is not economical in some cases, because the weather resistance does not increase proportionally.

Examples of the copper compound for use in the present invention include copper chloride, copper bromide, copper fluoride, copper iodide, copper thiocyanate, copper nitrate, copper acetate, copper naphthenate, copper caprate, copper laurate, copper stearate, copper acetylacetonate, copper(I) oxideandcopper(II) oxide, of which copper halides and copper acetate can be used particularly desirably. Amount of the above-described copper compound is from 10 to 1,000 ppm, preferably from 50 to 800 ppm, as the amount of copper in the copper compound, based on the polyamide. If the amount is smaller than 10 ppm, the resulting weather resistance-improving effect is insufficient. On the other hand, if the amount is larger than 1,000 ppm, the improvement in weather resistance becomes saturated and the effect proportional to the amount cannot be obtained. Furthermore, it causes corrosion of metals such as metals of a polymerization reactor, an extruder and a molding machine or corrosion of metals inserted into molding articles.

Also, it is desirable to use the copper compound of the present invention together with an iodine compound. Examples of the iodine compound include potassium iodide, magnesium iodide and ammonium iodide, and iodine itself may also be used. Preferred among them is potassium iodide. The iodide compound is used within the range of from 5 to 30, preferably from 10 to 25, as a gram atom ratio of iodine element to copper element ([iodine]/[copper]) based on the polyamide. Its amount if smaller than 5 would bear no sufficient weather resistance-improving effect and if larger than 30 would cause corrosion of metals, such as metals of a polymerization reactor, an extruder and a molding machine or metals inserted into molding articles.

Though not particularly limited, examples of the phosphite compound for use in the present invention include trioctyl phosphite, trilauryl phosphite, tridecyl phosphite, octyl-diphenyl phosphite, trisisodecyl phosphite, phenyldiisodecyl phosphite, phenyldiisodecyl phosphite, phenyldi(tridecyl) phosphite, diphenylisooctyl phosphite, diphenylisodecyl phosphite, diphenyltridecyl phosphite, triphenyl phosphite, tris(nonylphenyl) phosphite, tris(2,4-di-t-butylphenyl) phosphite, tris(butoxyethyl) phosphite, tetratridecyl-4,4'-butylidenebis(3-methyl-6-t-butylphenol) diphosphite, 4,4'-isopropylidene-diphenolalkyl phosphite (provided that the number of carbon atoms of the alkyl group is approximately from 12 to 15), 4,4'-isopropylidenebis(2-t-butylphenol).di(nonylphenyl) phosphite, tris(biphenyl) phosphite, tetra(tridecyl)-1,1,3-tris(2-methyl-5-t-butyl-4-hydroxyphenyl)butane diphosphite, tetra(tridecyl)-4,4'-butylidenebis (3-methyl-6-t-butylphenol) diphosphite, tetra ($C_1$–$C_{15}$ mixed alkyl)-4,4'-isopropylidenediphenyl diphosphite, tris (mono, di mixed nonylphenyl) phosphite, 4,4'-isopropylidenebis(2-t-butylphenol).di(nonylphenyl) phosphite, 9,10-di-hydro-9-oxa-9-oxa-10-phosphaphenanthrene-10-oxide, tris(3,5-di-t-butyl-4-hydroxyphenyl) phosphite, hydrogenated-4,4'-isopropylidenediphenyl polyphosphite, bis(octylphenyl).bis(4,4'-butylidenebis)3-methyl-6-t-butylphenol)).1,6-hexanol diphosphite, hexatridecyl-1,1,3-tris(2-methyl-4-hydroxy-5-t-butylphenol) diphosphite, tris(4,4'-isopropylidenebis(2-t-butylphenol)) phosphite, tris(1,3-stearoyloxyisopropyl) phosphite, 9,10-dihydro-9-phosphaphenanthrene-10-oxide and tetrakis(2,4-di-t-butylphenyl)-4,4'-biphenylene diphosphite.

Pentaerythritol type phosphite compounds can be exemplified as preferredphosphite compounds. Specific examples of the pentaerythritol type phosphite compounds include 2,6-di-t-butyl-4-methylphenyl.phenyl.pentaerythritol diphosphite, 2,6-di-t-butyl-4-methylphenyl.methyl.pentaerythritol diphosphite, 2,6-di-t-butyl-4-methylphenyl.2-ethylhexyl.pentaerythritol diphosphite, 2,6-di-t-butyl-4-methylphenyl.isodecyl.pentaerythritol diphosphite, 2,6-di-t-butyl-4-methylphenyl.lauryl.pentaerythritol diphosphite, 2,6-di-t-butyl-4-methylphenyl.isotridecyl.pentaerythritol diphosphite, 2,6-di-t-butyl-4-methylphenyl.steary.pentaerythritol diphosphite, 2,6-di-t-butyl-4-methylphenyl.cyclohexyl.pentaerythritol diphosphite, 2,6-di-t-butyl-4-methylphenyl.benzyl.pentaerythritol diphosphite, 2,6-di-t-butyl-4- methylphenyl.ethylcellosolve.pentaerythritol diphosphite, 2,6-di-t-butyl-4-methylphenyl.butylcarbitol.pentaerythritol diphosphite, 2,6- di-t-butyl-4-methylphenyl.octylphenyl.pentaerythritol diphosphite, 2,6-di-t-butyl-4-methylphenyl.nonyphenyl.pentaerythritol diphosphite, bis(2,6-di-t-butyl-4-methylphenyl)pentaerythritol diphosphite, bis(2,6-di-t-butyl-4-ethylphenyl)pentaerythritol diphosphite, 2,6-di-t-butyl-4-methylphenyl 2,6-di-t-butylphenyl.pentaerythritol diphosphite, 2,6-di-t-butyl-4-methylphenyl.2,4-di-t-butylphenyl.pentaerythritol diphosphite, 2,6-di-t-butyl-4-methylphenyl.2,4-di-t-octyl.pentaerythritol diphosphite, 2,6-di-t-butyl-4-methylphenyl.2-cyclohexylphenyl.pentaerythritol diphosphite, 2,6-di-t-amyl-4-methylphenyl.phenyl.pentaerythritol diphosphite and bis(2,6-di-t-amyl-4-methylphenyl)pentaerythritol diphosphite. Among these compounds, bis(2,6-di-t-butyl-4-methylphenyl)pentaerythritol diphosphite, bis(2,6-di-t-butyl-4-ethylphenyl)pentaerythritol diphosphite, bis(2,6-di-t-amyl-4-methylphenyl)pentaerythritol diphosphite and bis(2,6-di-t-octyl-4-methylphenyl)pentaerythritol diphosphite are most preferred, and bis(2,6-di-t-butyl-4-methylphenyl) pentaerythritol diphosphite is particularly preferred.

The aforementioned phosphite compound is used in an amount of from 10 to 10,000 ppm, preferably from 500 to 8,000 ppm, based on the polyamide (A). When the amount is smaller than 10 ppm, it may cause insufficient finishing conditions of the surface of the parts to be used, as well as their insufficient weather resistance depending on the environment where the parts are set. When further higher weather resistance is required, it can be improved by adding the phosphite compound with the upper limit of 10,000 ppm. However, the weather resistance improving effect is saturated when amount of the phosphite compound exceeds 10,000 ppm. Also, such a large amount may sometimes cause abnormally increased molecular weight during the production steps such as polymerization and melt kneading or at the time of melt molding processing, and the increment of molecular weight may reduce the fluidity, spoil the appearance and sometimes disable the molding itself.

Production of the black colored polyamide resin composition of the present invention can be effected by mixing and kneading the aforementioned components (A) to (D) and various additives which are used as occasion demands. In that case, formulation, kneading method and order are not particularly limited, and the mixing is carried out using a generally used mixer such as Henschel mixer, tumbler or ribbon blender. As the kneader, a single or twin screw extruder is generally used. In general, pellets comprised of the resin composition of the present invention are firstly produced using such an extruder, and then the pellets are made into a desired resin product by molding them into an optional shape by a molding method such as compression molding, injection molding or extrusion molding.

Though injection molding conditions are not particularly limited, a method in which molding is carried out at a molding temperature of from 250 to 310° C. and at a mold temperature of from 40 to 120° C. can be exemplified.

Also, though the mixing order of components for producing the composition of the present invention is not particularly limited, examples thereof include (1) a method in which the components (A), (B), (C) and (D) are kneaded in one portion, (2) a method in which the components (A) and (B) are melt-kneaded and then the components (C) and (D) are kneaded and (3) a method so-called pellet blending in which all of the components are not melt-kneaded but pellet-blended, namely, a portion of component (A) is melt-kneaded with component (B), the remaining portion of component (A) is melt-kneaded with the components (C) and (D) and then the thus kneaded materials are pellet-blended and subjected to the processing. In an alternative method, master pellets are produced in advance from the polyamide (a2) containing high concentrations of carbon black and a copper-phthalocyanine derivative, and the thus prepared pellets are again blended or kneaded with the polyamide resin containing an inorganic filler. In addition, the copper compound and phosphite compound can be added in advance at the time of polymerization of the polyamide (A) or at the time of melt kneading of the polyamide components (A) and (B) and/or (C) and/or (D). In carrying out the melt kneading of polyamide and glass fiber, usual single or twin screw extruder can be used, and the aspect ratio of glass fiber can be controlled within a predetermined range by optionally selecting construction and revolution speed of the screw, extrusion temperature and the supply port of glass fiber.

As occasion demands, the polyamide resin composition of the present invention may contain additives usually added to polyamide resins, such as an antioxidant, an ultraviolet absorber, a heat stabilizer, a light deterioration preventing agent, a plasticizer, a lubricant, a release agent, a nucleating agent and a flame-retardant, within such ranges that they do not spoil the object of the present invention, or may be blended with other thermoplastic resin.

The composition obtained by the present invention can be applied to automobile parts such as outer door handles, wheel caps, roof rails, door mirror bases, room mirror arms, sunroof deflectors, radiator fans and bearing retainers, various office parts such as legs, seat supports and armrests of tables and chairs and industrial and miscellaneous uses such as wheelchairs, door handles, handrails, gripping bars for bathroom use, window knobs and grating materials.

EXAMPLES

The present invention is described in greater detail with reference to the following Examples, but the invention should not be construed as being limited thereto. The evaluation methods used in the Examples are as follows.

Crystallization Temperature

This was measured as a crystallization peak top temperature in accordance with the procedure of JIS K 7172, by precisely weighing In about 10 mg of each polyamide resin composition, keeping the sample for 5 minutes at a temperature of melting point plus 30° C. and then measuring the crystallization temperature at a temperature cooling rate of 20° C./minute using DSC 7 manufactured by Perkin-Elmer.

Average Fiber Diameter of Glass Fibers

Pellets of each polyamide resin composition were put into formic acid to effect dissolution of polyamide and precipitation of glass fibers. The thus obtained precipitate was observed under a light microscope, and diameters of randomly selected 300 to 1,000 glass fibers were measured using an image analyzer IP-1000 manufactured by Asahi Chemical Industry to obtain number average fiber diameter.

Tensile Characteristics

Using an injection molding machine IS50EP manufactured by Toshiba Machine, test pieces were obtained at a cylinder temperature of 290° C. by optionally adjusting the injection pressure and speed so that the loading time became about 1 second.

In this case, the mold temperature was optionally set within the range of from 80 to 120° C. in response to the glass transition temperature of each polyamide. Using the thus obtained test pieces, tensile strength and tensile elongation were measured in accordance with the procedure of ASTM D 638.

Flexural Modulus at the Time of Water Absorption

Test pieces were obtained by the same method of (3) used for the measurement of tensile characteristics, the thus obtained molding articles were allowed to stand in a thermo-hygrostat controlled at a room temperature of 23° C. and at a relative humidity of 50% until they reached equilibrium water absorption, and then flexural modulus was measured in accordance with the procedure of ASTM D 790.

Surface Gloss

Using an injection molding machine IS150 manufactured by Toshiba Machine, injection-molded plates having a size of 100×90×3 mm were obtained at a cylinder temperature of 290° C. and at a mold temperature of 90° C. or 120° C. by optionally adjusting the injection pressure and speed so that the loading time became about 1.5 seconds. Using these plates and a gloss meter (IG 320 manufactured by HORIBA), the 60 degree gloss was measured im accordance with the procedure of JIS K 7150.

Weather Resistance

Injection-molded plates obtained at a mold temperature of 120° C. in the same manner as the above-described method for surface gloss evaluation were evaluated using a xenon arc type accelerated weathering machine (XENOTEST 1200CPS, manufactured by Atlas) by exposing them for 300 hours to an environment of 12 minutes per hour of water spraying and a black panel temperature of 83° C. Surface glosses and color tones before and after the exposure were measured to obtain gloss retention and color difference, respectively. The measuring method is as described above. The gloss retention is expressed by percentage of the gloss after exposure to the gloss before exposure, and it can be judged that weather resistance is good when the gloss retention is high and the color difference (ΔE) is small. In this case, the color difference was measured using a color difference meter ND-300A manufactured by Nippon Denshoku.

Materials used in the Examples are shown below.

(A) Polyamnide
- a1: Polyamide 66/6I (80/20) copolymer obtained in Polymerization Example 1, which is described below
  Crystallization temperature: 195° C.
- a2: Polyamide 66/6I/6T (70/20/10) copolymer obtained in Polymerization Example 2, which is described below
  Crystallization temperature: 195° C.
- a3: Polyamide MXD6, mfd. by Mitsubishi Engineering Plastics
  Crystallization temperature: 205° C.
- a4: Polyamide 66, mfd. by Asahi Chemical Industry; Trade name, Leona 1300
  Crystallization temperature: 225° C.
- a5: Polyamide 6, mfd. by Ube Industries; Trade name SF1013A
  Crystallization temperature: 162° C.
- a6: Polyamide 66/6I (80/20) copolymer obtained in Polymerization Example 3, which is described below (contains a copper compound)
  Crystallization temperature: 195° C.

(B) Inorganic Filler
- b1: Glass fiber, mfd. by Asahi Fiber Glass Trade name, CS03JA416 Average fiber diameter, 10 μm
- b2: Glass fiber, mfd. by Asahi Fiber Glass Trade name, CS03TAFT692 Average fiber diameter, 23 μm
- b3: Wollastonite, mfd. by Hayashi Kasei Trade name, VM-8N
- b4: Baked kaolin, mfd. by Engelhard Trade name, Translink 445
- b5: Talc, mfd. by Tatsumori Trade name, CRS6002
- b6: Mica, mfd. by Repco Trade name, M-325CT (C) Carbon Black
- c1: Furnace carbon black, mfd. by Mitsubishi Kagaku; #50
- c2: Channel carbon black, mfd. by Degussa; FW200

(D) Copper-phthalocyanine Derivative
- d1: Copper-phthalocyanine sulfonamide derivative

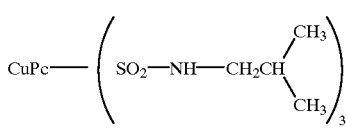

Manufactured by Dainippon Ink & Chemicals

- d2: Copper-phthalocyanine imidomethyl derivative

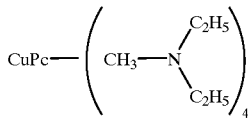

Manufactured by Dainippon Ink & Chemicals (E) Phosphite Compound
- e1: Bis (2,6-di-t-butyl-4-methylphenyl) pentaerythritol diphosphite, mfd. by Adeka-Argus Chemical Co., Ltd.; trade name, a PEP-36
- e2: Tris (2,4-di-t-butylphenyl) phosphite, mfd. by Ciba-Geigy; trade name, Irgafos 168

Polymerization Example 1

A 2.00 kg portion of equimolar salt of adipic acid and hexamethylenediamine, 0.44 kg of equimolar salt of isophthalic acid and hexamethylenediamine, 0.10 kg of adipic acid and 2.5 kg of pure water were put into a five liter capacity autoclave and thoroughly stirred. The atmosphere in the vessel was thoroughly replaced with $N_2$ and then the temperature was increased from room temperature to 220° C. spending about 1 hour while stirring the materials. In this case, the internal pressure increased to 18 kg/cm$^2$-G due to natural pressure by water vapor in the autoclave, but the heating was continued by removing water from the reaction system so that the internal pressure did not exceed 18 kg/cm$^2$-G. When the internal temperature reached 260° C. two hours thereafter, the heating was stopped, the exhaust valve of the autoclave was closed and the contents were cooled down to room temperature spending about 8 hours. After cooling, the autoclave was opened and about 2 kg of the thus formed polymer was taken out and pulverized. The thus pulverized polymer was put into a 10 liter capacity evaporator and subjected to 10 hours of solid-state polymerization at 200° C. in a stream of nitrogen. The polyamide obtained by solid-state polymerization had a terminal carboxyl group content of 102 meq./kg and a terminal amino group content of 44 meq./kg.

Polymerization Example 2

A 1.75 kg portion of equimolar salt of adipic acid and hexamethylenediamine, 0.50 kg of equimolar salt of isophthalic acid and hexamethylenediamine, 0.25 kg of equimolar salt of terephthalic acid and hexamethylenediamine, 0.10 kg of adipic acid and 2.5 kg of pure water were put into a five liter capacity autoclave and thoroughly stirred. The atmosphere in the vessel was thoroughly replaced with $N_2$ and then the temperature was increased from room temperature to 220° C. spending about 1 hour while stirring the materials. In this case, the internal pressure increased to 18 $kg/cm^2$-G due to natural pressure by water vapor in the autoclave, but the heating was continued by removing water from the reaction system so that the internal pressure did not exceed 18 $kg/cm^2$-G. When the internal temperature reached 260° C. two hours thereafter, the heating was stopped, the exhaust valve of the autoclave was closed and the contents were cooled down to room temperature spending about 8 hours. After cooling, the autoclave was opened and about 2 kg of the thus formed polymer was taken out and pulverized. The thus pulverized polymer was put into a 10 liter capacity evaporator and subjected to 10 hours of solid-state polymerization at 200° C. in a stream of nitrogen. The polyamide thus obtained by solid-state polymerization had a terminal carboxyl group content of 105 meq./kg and a terminal amino group content of 38 meq./kg.

Polymerization Example 3

A 2.00 kg portion of equimolar salt of adipic acid and hexamethylenediamine, 0.5 kg of equimolar salt of isophthalic acid and hexamethylenediamine, 0.10 kg of adipic acid, 2.5 kg of pure water, 0. 63 g of copper iodide and 11.1 g of potassium iodide were put into a five liter capacity autoclave and thoroughly stirred. The atmosphere in the vessel was thoroughly replaced with $N_2$ and then the temperature was increased from room temperature to 220° C. spending about 1 hour while stirring the materials. In this case, the internal pressure increased to 18 $kg/cm^2$-G due to natural pressure by water vapor in the autoclave, but the heating was continued by removing water from the reaction system so that the internal pressure did not exceed 18 $kg/cm^2$-G. When the internal temperature reached 260° C. two hours thereafter, the heating was stopped, the exhaust valve of the autoclave was closed and the contents were cooled down to room temperature spending about 8 hours. After cooling, the autoclave was opened and about 2 kg of the thus formed polymer was taken out and pulverized. The thus pulverized polymer was put into a 10 liter capacity evaporator and subjected to 10 hours of solid-state polymerization at 200° C. in a stream of nitrogen. The polyamide thus obtained by solid-state polymerization had a terminal carboxyl group content of 102 meq./kg and a terminal amino group content of 44 meq./kg.

Inventive Example 1

A mixture consisting of a1 as the polyamide, c1 as the carbon black and d1 as the copper-phthalocyanine derivative was fed into a 35-mm diameter twin screw extruder TEM manufactured by Toshiba Machine (set-up temperature, 280° C.; screw revolution, 300 rpm) through a feed hopper, and b1 as the inorganic filler was supplied through a side feed inlet, each component in such an amount that the final composition shown in Table 1 was obtained, and the thus melt-kneaded product extruded from the spinning nozzle was cooled in a strand shape and formed into pellets to obtain a black colored reinforced polyamide resin composition.

Inventive Example 2

A black colored reinforced polyamide resin composition was obtained in the same manner as described in Inventive Example 1, except that a6 was used as the polyamide.

Inventive Example 3

A mixture consisting of a6 as the polyamide, c1 as the carbon black, d1 as the copper-phthalocyanine derivative and e1 as the phosphite compound was fed into a 35-mm diameter twin screw extruder TEM manufactured by Toshiba Machine (set-up temperature, 280° C.; screw revolution, 300 rpm) through a feed hopper, and b1 as the inorganic filler was supplied through a side feed inlet, each component in such an amount that the final composition shown in Table 1 was obtained, and the thus melt-kneaded product extruded from the spinning nozzle was cooled in a strand shape and formed into pellets to obtain a black colored reinforced polyamide resin composition.

Inventive Example 4

A black colored reinforced polyamide resin composition having the final composition shown in Table 1 was obtained in the same manner as described in Inventive Example 1.

Inventive Example 5

A mixture consisting of 85.6 parts by weight of a5 as the polyamide, 12 parts by weight of c1 as the carbon black and 2.4 parts by weight of d1 as the copper-phthalocyanine derivative was fed into a 35-mm diameter twin screw extruder TEM manufactured by Toshiba Machine (set-up temperature, 250° C.; screw revolution, 300 rpm) through a feed hopper to obtain a black color master batch. Next, a1 as the polyamide and the just prepared black color master batch were mixed and fed into a 35-mm diameter twin screw extruder TEM manufactured by Toshiba Machine (set-up temperature, 280° C.; screw revolution, 300 rpm) through a feed hopper, and b1 as the inorganic filler was supplied through a side feed inlet, each component in such an amount that the final composition shown in Table 1 was obtained, and the thus melt-kneaded product extruded from the spinning nozzle was cooled in a strand shape and formed into pellets to obtain a black colored reinforced polyamide resin composition.

Inventive Example 6

A mixture consisting of a6 as the polyamide and the black color master batch obtained in Inventive Example 5 was fed into a 35-mm diameter twin screw extruder TEM manufactured by Toshiba Machine (set-up temperature, 280° C.; screw revolution, 300 rpm) through a feed hopper, and b1 as the inorganic filler was supplied through a side feed inlet, each component in such an amount that the final composition shown in Table 1 was obtained, and the thus melt-kneaded product extruded from the spinning nozzle was cooled in a strand shape and formed into pellets to obtain a black colored reinforced polyamide resin composition.

Inventive Example 7

A black colored reinforced polyamide resin composition having the final composition shown in Table 1 was obtained in the same manner id as described in Inventive Example 1, except that b2.was used as the inorganic filler.

TABLE 1

| Inventive Example | 1 | 2 | 3 | 4 | 5 | 6 | 7 |
|---|---|---|---|---|---|---|---|
| (A) Polyamide resin | a1 | a6 | a1 | a1 | a1, a5 | a6, a5 | a1 |
| Amount (parts by weight) | 67 | 67 | 67 | 50 | 45.7, 4.3 | 40, 5 | 40 |
| Crystaliization temperature (° C.) | 195 | 195 | 195 | 195 | 195 | 195 | 195 |
| (B) Inorganic filler | b1 | b1 | b2 | b1 | b1 | b1 | b2 |
| Amount (parts by weight) | 33 | 33 | 33 | 50 | 50 | 55 | 60 |
| Average glass fiber diameter ($\mu$m) | 10 | 10 | 23 | 10 | 10 | 10 | 23 |
| (C) Carbon black | c1 | c1 | c1 | c1 | c1 | c1 | c1 |
| Amount (parts by wt. per (A) + (B)) | 0.6 | 0.6 | 0.6 | 0.6 | 0.6 | 0.6 | 0.6 |
| (D) Copper-phthalocyanine derivative | d1 | d1 | d1 | d1 | d1 | d1 | d1 |
| Amount (parts by wt. Per (C)) | 20 | 20 | 20 | 20 | 20 | 20 | 20 |
| Amount (parts by wt. Per (B)) | 0.36 | 0.36 | 0.36 | 0.24 | 0.24 | 0.21 | 0.2 |
| Copper compound: CuI | | | | | | | |
| Amount (ppm per polyamide) | — | 100 | 100 | — | — | 89 | — |
| Halogen/Cu (molar ratio) | — | 20 | 20 | — | — | 20 | — |
| (E) Phosphite compound | — | — | e1 | — | — | — | — |
| Amount (ppm per polyamide) | — | — | 2000 | — | — | — | — |
| Tensile elongation (%) | 5 | 5 | 5 | 5 | 5 | 5 | 5 |
| Flexural modulus at the time of water absorption (kg/cm2) | 75000 | 75000 | 75000 | 120000 | 120000 | 130000 | 130000 |
| Surface gloss (mold temperature, 90° C.) | 88 | 88 | 88 | 85 | 85 | 83 | 83 |
| Surface gloss (mold temperature, 120° C.) | 88 | 88 | 88 | 85 | 85 | 83 | 83 |
| Weather resistance (gloss retention %) | 65 | 68 | 87 | 45 | 45 | 60 | 50 |
| Weather resistance ($\Delta$E) | 6 | 4 | 2 | 11 | 11 | 10 | 8 |

Inventive Examples 8 to 13

Black colored reinforced polyamide resin compositions were obtained in the same manner as described in Inventive Example 7, except that kinds and blending amounts of the carbon black and copper-phthalocyanine derivative were changed as shown in Table 2.

Inventive Example 14

A mixture consisting of a1 as the polyamide and the black color master batch obtained in Inventive Example 5 was fed intoa 35-mm diameter twin screw extruder TEM manufactured by Toshiba Machine (set-up temperature, 280° C.; screw revolution, 300 rpm) through a feed hopper, and b2 as the inorganic filler was supplied through a side feed inlet, each component in such an amount that the final composition shown in Table 2 was obtained, and the thus melt-kneaded product extruded from the spinning nozzle was cooled in a strand shape and formed into pellets to obtain a black colored reinforced polyamide resin composition.

TABLE 2

| Inventive Exanple | 8 | 9 | 10 | 11 | 12 | 13 | 14 |
|---|---|---|---|---|---|---|---|
| (A) Polyamide resin | a1 | a1 | a1 | a1 | a1 | a1 | a1, a5 |
| Amount (parts by weight) | 40 | 40 | 40 | 40 | 40 | 40 | 35.7, 4.3 |
| Crystallization temperature (° C.) | 195 | 195 | 195 | 195 | 195 | 195 | 195 |
| (B) Inorganic filler | b2 | b2 | b2 | b2 | b2 | b2 | b2 |
| Amount (parts by weight) | 60 | 60 | 60 | 60 | 60 | 60 | 60 |
| Average glass fiber diameter ($\mu$m) | 23 | 23 | 23 | 23 | 23 | 23 | 23 |
| (C) Carbon black | c1 | c1 | c2 | c1 | c1 | c1 | c1 |
| Amount (parts by wt. per (A) + (B)) | 0.3 | 1.2 | 0.6 | 0.6 | 0.6 | 0.6 | 0.6 |
| (D) Copper-phthalocyanine derivative | d1 | d1 | d1 | d1 | d1 | d2 | d1 |
| Amount (parts by wt. Per (C)) | 20 | 20 | 20 | 10 | 80 | 20 | 20 |
| Amount (parts by wt. Per (B)) | 0.2 | 0.2 | 0.2 | 0.1 | 0.8 | 0.2 | 0.2 |
| Copper compound: CuI | | | | | | | |
| Amount (ppm per polyamide) | — | — | — | — | — | — | — |

TABLE 2-continued

| Inventive Exanple | 8 | 9 | 10 | 11 | 12 | 13 | 14 |
|---|---|---|---|---|---|---|---|
| Halogen/Cu (molar ratio) | — | — | — | — | — | — | — |
| (E) Phosphite compound | — | — | — | — | — | — | — |
| Amount (ppm per polyamide) | — | — | — | — | — | — | — |
| Tensile elongation (%) | 5 | 5 | 5 | 5 | 5 | 5 | 5 |
| Flexural modulus at the time of water absorption (kg/cm2) | 130000 | 130000 | 130000 | 130000 | 130000 | 130000 | 130000 |
| Surface gloss (mold temperature, 90° C.) | 85 | 78 | 85 | 78 | 83 | 75 | 83 |
| Surface gloss (mold temperature, 120° C.) | 85 | 78 | 85 | 78 | 83 | 75 | 83 |
| Weather resistance (gloss retention %) | 50 | 60 | 55 | 55 | 55 | 45 | 55 |
| Weather resistance (ΔE) | 9 | 7 | 9 | 8 | 8 | 10 | 8 |

Inventive Example 15

A mixture consisting of a1 and a6 as the polyamide and the black color master batch obtained in Inventive Example 5 was fed into a 35-mm diameter twin screw extruder TEM manufactured by Toshiba Machine (set-up temperature, 280° C.; screw revolution, 300 rpm) through a feed hopper, and b2 as the inorganic filler was supplied through a side feed inlet, each component in such an amount that the final composition shown in Table 3 was obtained, and the thus melt-kneaded product extruded from the spinning nozzle was cooled in a strand shape and formed into pellets to obtain a black colored reinforced polyamide resin composition.

Inventive Example 16

A mixture consisting of a6 as the polyamide and the black color master batch obtained in Inventive Example 5 was fed into a 35-mm diameter twin screw extruder TEM manufactured by Toshiba Machine (set-up temperature, 280° C.; screw revolution, 300 rpm) through a feed hopper, and b2 as the inorganic filler was supplied through a side feed inlet, each component in such an amount that the final composition shown in Table 3 was obtained, and the thus melt-kneaded product extruded from the spinning nozzle was cooled in a strand shape and formed into pellets to obtain a black colored reinforced polyamide resin composition.

Inventive Example 17

A mixture consisting of a1 as the polyamide, the black color master batch obtained in Inventive Example 5, CuI as the copper compound and KI was fed into a 35-mm diameter twin screw extruder TEM manufactured by Toshiba Machine (set-up temperature, 280° C.; screw revolution, 300 rpm) through a feed hopper, and b2 as the inorganic filler was supplied through a side feed inlet, each component in such an amount that the final composition shown in Table 3 was obtained, and the thus melt-kneaded product extruded from the spinning nozzle was cooled in a strand shape and formed into pellets to obtain a black colored reinforced polyamide resin composition.

Inventive Examples 18 and 19

Black colored reinforced polyamide resin compositions were obtained in the same manner as described in Inventive Example 14, except that kinds and amounts of the phosphite compound were changed as shown in Table 3, mixed with the polyamide and fed into the extruder.

Inventive Example 20

A black colored reinforced polyamide resin composition was obtained in the same manner as described in Inventive Example 18, except that a6 as the polyamide and b1 as the inorganic filler were used.

Inventive Example 21

A black colored reinforced polyamide resin composition was obtained in the same manner as described in Inventive Example 20, except that b2 was used as the inorganic filler.

TABLE 3

| Inventive Example | 15 | 16 | 17 | 18 | 19 | 20 | 21 |
|---|---|---|---|---|---|---|---|
| (A) Polyamide resin | a1, a6, a5 | a6, a5 | a1, a5 | a1, a5 | a1, a5 | s6, a5 | a6, a5 |
| Amount (parts by weight) | 25.7, 10, 4.3 | 35.7, 4.3 | 35.7, 4.3 | 35.7, 4.3 | 35.7, 4.3 | 35.7, 4.3 | 35.7, 4.3 |
| Crystallization temperature (° C.) | 195 | 195 | 195 | 195 | 195 | 195 | 195 |
| (B) Inorganic filler | b2 | b2 | b2 | b2 | b2 | b1 | b2 |
| Amount (parts by weight) | 60 | 60 | 60 | 60 | 60 | 60 | 60 |
| Average glass fiber diameter (μm) | 23 | 23 | 23 | 23 | 23 | 10 | 23 |
| (C) Carbon black | c1 | c1 | c1 | c1 | c1 | c1 | c1 |
| Amount (parts by wt. per (A) + (B)) | 0.6 | 0.6 | 0.6 | 0.6 | 0.6 | 0.6 | 0.6 |
| (D) Copper-phthalocyanine derivative | d1 | d1 | d1 | d1 | d1 | d1 | d1 |
| Amount (parts by wt. Per (C)) | 20 | 20 | 20 | 20 | 20 | 20 | 20 |

TABLE 3-continued

| Inventive Example | 15 | 16 | 17 | 18 | 19 | 20 | 21 |
|---|---|---|---|---|---|---|---|
| Anount (parts by wt. Per (B)) | 0.2 | 0.2 | 0.2 | 0.2 | 0.2 | 0.2 | 0.2 |
| Copper compound: CuI | | | | | | | |
| Amount (ppm per polyamide) | 25 | 88 | 1000 | — | — | 88 | 88 |
| Halogen/Cu (molar ratio) | 20 | 20 | 20 | — | — | 20 | 20 |
| (E) Phosphite compound | — | — | — | e1 | e2 | e1 | e1 |
| Amount (ppm per polyamide) | — | — | — | 2000 | 2000 | 2000 | 2000 |
| Tensile elongation (%) | 5 | 5 | 5 | 5 | 5 | 5 | 5 |
| Flexural modulus at the time of water absorption (kg/cm2) | 130000 | 130000 | 130000 | 130000 | 130000 | 130000 | 130000 |
| Surface gloss (mold temperature, 90° C.) | 83 | 83 | 83 | 83 | 83 | 83 | 83 |
| Surface gloss (mold temperature, 120° C.) | 83 | 83 | 83 | 83 | 83 | 83 | 83 |
| Weather resistance (gloss retention %) | 60 | 70 | 70 | 60 | 55 | 60 | 78 |
| Weather resistance (ΔE) | 6 | 4 | 4 | 6 | 7 | 6 | 3 |

Inventive Example 22

A mixture consisting of a1 as the polyamide, b4 as a portion of the inorganic tiller, c1 as the carbon black and d1 as the copper-phthalocyanine derivative was fed into a 35-m diameter twin screw extruder TEM manufactured by Toshiba Machine (set-up temperature, 280° C.; screw revolution, 300 rpm) through a feed hopper, and b1 as the remaining portion of the inorganic filler was supplied through a side feed inlet, each component in such an amount that the final composition shown in Table 4 was obtained, and the thus melt-kneaded product extruded from the spinning nozzle was cooled in a strand shape and formed into pellets to obtain a black colored reinforced polyamide resin composition.

Inventive Example 23

A black colored reinforced polyamide resin composition having the final composition shown in Table 4 was obtained in the same manner as described in Inventive Example 1, except that b3 was used as the inorganic filler.

Inventive Example 24

A mixture consisting of a6 as the polyamide, b3 as a portion of the inorganic filler and the black color master batch obtained in Inventive Example 5 was fed into a 35-mm diameter twin screw extruder TEM manufactured by Toshiba Machine (set-up temperature, 280° C.; screw revolution, 300 rpm) through a feed hopper, and b2 as the remaining portion of the inorganic filler was supplied through a side feed inlet, each component in such an amount that the final composition shown in Table 4 was obtained, and the thus melt-kneaded product extruded from the spinning nozzle was cooled in a strand shape and formed into pellets to obtain a black colored reinforced polyamide resin composition.

Inventive Example 25

A mixture consisting of a6 as the polyamide, b5 as a portion of the inorganic filler and the black color master batch obtained in Inventive Example 5 was fed into a 35-mm diameter twin screw extruder TEM manufactured by Toshiba Machine (set-up temperature, 280° C.; screw revolution, 300 rpm) through a feed hopper, and b1 as the remaining portion of the inorganic filler was supplied through a side feed inlet, each component in such an amount that the final composition shown in Table 4 was obtained, and the thus melt-kneaded product extruded from the spinning nozzle was cooled in a strand shape and formed into pellets to obtain a black colored reinforced polyamide resin composition.

Inventive Example 26

A mixture consisting of a6 as the polyamide, the black color master batch obtained in Inventive Example 5 and b6 as a portion of the inorganic filler was fed into a 35-imm diameter twin screw extruder TEM manufactured by Toshiba Machine (set-up temperature, 280° C.; screw revolution, 300 rpm) through a feed hopper, and b1 as the remaining portion of the inorganic filler was supplied through a side feed inlet, each component in such an amount that the final composition shown in Table 4 was obtained, and the thus melt-kneaded product extruded from the spinning nozzle was cooled in a strand shape and formed into pellets to obtain a black colored reinforced polyamide resin composition.

Inventive Example 27

A black colored reinforced polyamide resin composition having the final composition shown in Table 4 was obtained in the same manner as described in Inventive Example 1, except that a2 was used as the polyamide.

Inventive Example 28

A black colored reinforced polyamide resin composition having the final composition shown in Table 4 was obtained in the same manner as described in Inventive Exaimple 1, except that a3 was used as the polyamide

TABLE 4

| Inventive Example | 22 | 23 | 24 | 25 | 26 | 27 | 28 |
|---|---|---|---|---|---|---|---|
| (A) Polyamide resin | a1 | a1 | a6, a5 | a6, a5 | a6, a5 | a2 | a3 |
| Amount (parts by weight) | 50 | 60 | 35.7, 4.3 | 55.7, 4.3 | 35.7, 4.3 | 50 | 50 |
| Crystallization temperature (° C.) | 195 | 195 | 195 | 195 | 195 | 195 | 205 |
| (B) Inorganic filler | b1, b4 | b3 | b2, b3 | b1, b5 | b1, b6 | b1 | b1 |
| Amount (parts by weight) | 25, 25 | 40 | 30, 30 | 20, 20 | 20, 20 | 50 | 50 |
| Average glass fiber diameter ($\mu$m) | 10, — | — | 23, — | 10, — | 10, — | 10 | 10 |
| (C) Carbon black | c1 | c1 | c1 | c1 | c1 | c1 | c1 |
| Amount (parts by wt. per (A) + (B)) | 0.6 | 0.6 | 0.6 | 0.6 | 0.6 | 0.6 | 0.6 |
| (D) Copper-phthalocyanine derivative | d1 | d1 | d1 | d1 | d1 | d1 | d1 |
| Amount (parts by wt. Per (C)) | 20 | 20 | 20 | 20 | 20 | 20 | 20 |
| Amount (parts by wt. Per (B)) | 0.2 | 0.2 | 0.2 | 0.2 | 0.2 | 0.2 | 0.2 |
| Copper compound: CuI | | | | | | | |
| Amount (ppm per polyamide) | — | — | 88 | 88 | 88 | — | — |
| Halogen/Cu (molar ratio) | — | — | 20 | 20 | 20 | — | — |
| (E) Phosphite compound | — | — | — | — | — | — | — |
| Amount (ppm per polyamide) | — | — | — | — | — | — | — |
| Tensile elongation (%) | 4 | 5 | 5 | 5 | 5 | 5 | 5 |
| Flexural modulus at the time of water absorption (kg/cm2) | 52000 | 50000 | 100000 | 60000 | 70000 | 120000 | 140000 |
| Surface gloss (mold temperature, 90° C.) | 90 | 80 | 80 | 75 | 78 | 65 | 35 |
| Surface gloss (mold temperature, 120° C.) | 90 | 80 | 80 | 75 | 78 | 85 | 90 |
| Weather resistance (gloss retention %) | 40 | 40 | 60 | 70 | 60 | 45 | 40 |
| Weather resistance ($\Delta$E) | 13 | 13 | 7 | 4 | 6 | 11 | 11 |

Inventive Example 29

A mixture consisting of a3 and a4 as the polyamide, the black color master batch obtained in Inventive Example 5, b5 as a portion of the inorganic filler, CuI as the copper compound and KI was fed into a 35-mm diameter twin screw extruder TEM manufactured by Toshiba Machine (set-up temperature, 280° C.; screw revolution, 300 rpm) through a feed hopper, and b1 as the remaining portion of the inorganic filler was supplied through a side feed inlet, each component in such an amount that the final composition shown in Table 5 was obtained, and the thus melt-kneaded product extruded from the spinning nozzle was cooled in a strand shape and formed into pellets to obtain a black colored reinforced polyamide resin composition.

Inventive Example 30

A mixture consisting of a3 as the polyamide, the black color master batch obtained in Inventive Example 5, CuI as the copper compound and KI was fed into a 35-mm diameter twin screw extruder TEM manufactured by Toshiba Machine (set-up temperature, 280° C.; screw revolution, 300 rpm) through a feed hopper, and b1 as the inorganic filler was supplied through a side feed inlet, each component in such an amount that the final composition shown in Table 5 was obtained, and the thus melt-kneaded product extruded from the spinning nozzle was cooled in a strand shape and formed into pellets to obtain a black colored reinforced polyamide resin composition.

Inventive Examples 31 and 33

Black colored reinforced polyamide resin compositions having the final compositions shown in Table 5 were obtained in the same manner as described in Inventive Example 1, except that a5 was used as the polyamide.

Inventive Examples 32 and 34

Black colored reinforced polyamide resin compositions having the final compositions shown in Table 5 was obtained in the same manner as described in Inventive Example 31, except that b2 was used as the inorganic filler.

TABLE 5

| Inventive Example | 29 | 30 | 31 | 32 | 33 | 34 |
|---|---|---|---|---|---|---|
| (A) Polyamide resin | a3, a4, a5 | a3, a5 | a5 | a5 | a5 | a5 |
| Amount (parts by weight) | 45.7, 5, 4.3 | 24, 16 | 50 | 50 | 67 | 67 |
| Crystallization temperature (° C.) | 205 | 180 | 180 | 180 | 180 | 180 |
| (B) Inorganic filler | b1, b6 | b1 | b1 | b2 | b1 | b2 |
| Amount (parts by weight) | 25, 20 | 60 | 50 | 50 | 33 | 33 |
| Average glass fiber diameter ($\mu$m) | 10, — | 10 | 10 | 23 | 10 | 23 |
| (C) Carbon black | c1 | c1 | c1 | c1 | c1 | c1 |
| Amount (parts by wt. per | 0.6 | 0.6 | 0.6 | 0.6 | 0.6 | 0.6 |

TABLE 5-continued

| Inventive Example | 29 | 30 | 31 | 32 | 33 | 34 |
|---|---|---|---|---|---|---|
| (A) + (B)) | | | | | | |
| (D) Copper-phthatocyanine derivative | d1 | d1 | d1 | d1 | d1 | d1 |
| Amount (parts by wt. Per (C)) | 20 | 20 | 20 | 20 | 20 | 20 |
| Amount (parts by wt. Per (B)) | 0.2 | 0.2 | 0.2 | 0.2 | 0.2 | 0.2 |
| Copper compound: CuI | | | | | | |
| Amount (ppm per polyamde) | 200 | 100 | — | — | — | — |
| Halogen/Cu (molar ratio) | 10 | 10 | — | — | — | — |
| (E) Phosphite compound | — | — | — | — | — | — |
| Amount (ppm per polyamide) | — | — | — | — | — | — |
| Tensile elongation (%) | 4 | 5 | 5 | 5 | 5 | 5 |
| Flexural modulus at the time of water absorption (kg/cm2) | 120000 | 130000 | 90000 | 90000 | 55000 | 55000 |
| Surface gloss (mold temperature, 90° C.) | 35 | 80 | 80 | 82 | 83 | 83 |
| Surface gloss (mold temperature, 120° C.) | 90 | 80 | 80 | 82 | 83 | 83 |
| Weather resistance (gloss retention %) | 40 | 40 | 40 | 45 | 45 | 50 |
| Weather resistance (ΔE) | 10 | 11 | 13 | 10 | 10 | 8 |

Inventive Example 35

A black colored reinforced polyamide resin composition was obtained in the same manner as described in Inventive Example 34, except that amount of the copper-phthalocyanine derivative was changed as shown in Table 6.

Inventive Example 36

A black colored reinforced polyamide resin composition having the final composition shown in Table 6 was obtained in the same manner as described in Inventive Example 1, except that a4 was used as the polyamide.

Inventive Example 37

A mixture consisting of a5 as the polyamide, CuI as the copper compound and KI was fed into a, 35-mm diameter twin screw extruder TEM an amount that the final composition shown in Table 6 was obtained, and the thus melt-kneaded product extruded from the spinning nozzle was cooled in a strand shape and formed into pellets to obtain a black colored reinforced polyamide resin composition.

TABLE 6

| Inventive Example | 35 | 36 | 37 |
|---|---|---|---|
| (A) Polyamide resin | a5 | a4 | a5 |
| Amount (parts by weight) | 67 | 67 | 50 |
| Crystallization temperature (° C.) | 180 | 225 | 180 |
| (B) Inorganic filler | b1 | b1 | b1 |
| Amount (parts by weight) | 33 | 33 | 50 |
| Average glass fiber diameter (μm) | 10 | 10 | 10 |
| (C) Carbon black | c1 | c1 | c1 |
| Amount (parts by wt. per (A) + (B)) | 0.6 | 0.6 | 0.6 |
| (D) Copper-phthalocyanine derivative | d1 | d1 | d1 |
| Amount (parts by wt. Per (C)) | 80 | 20 | 20 |
| Amount (parts by wt. Per (B)) | 1.45 | 0.36 | 0.2 |
| Copper compound: CuI | | | |
| Amount (ppm per polyamide) | — | — | 100 |
| Halogen/Cu (molar ratio) | — | — | 20 |
| (E) Phosphite compound | — | — | — |
| Amount (ppm per polyamide) | — | — | — |

TABLE 6-continued

| Inventive Example | 35 | 36 | 37 |
|---|---|---|---|
| Tensile elongation (%) | 6 | 6 | 5 |
| Flexural modulus at the time of water absorption (kg/cm2) | 55000 | 60000 | 60000 |
| Surface gloss (mold temperature, 90° C.) | 83 | 70 | 70 |
| Surface gloss (mold temperature, 120° C.) | 83 | 75 | 75 |
| Weather resistance (gloss retention %) | 45 | 45 | 57 |
| Weather resistance (ΔE) | 10 | 10 | 2 |

Comparative Example 1

A mixture consisting of a1 as the polyamide, c1 as the carbon black and d1 as the copper-phthalocyanine derivative having the composition shown in Table 7 was fed into a 35-mm diameter twin screw extruder TEM manufactured by Toshiba Machine (set-up temperature, 280° C.; screw revolution, 300 rpm) through a feed hopper, and the thus melt-kneaded product extruded from the spinning nozzle was cooled in a strand shape and formed into pellets to obtain a black colored reinforced polyamide resin composition.

The flexural modulus at the time of water absorption is low in comparison with Inventive Examples 1, 4, 5 and 7.

Comparative Example 2

A black colored reinforced polyamide resin composition was obtained in the same manner as described in Inventive Example 7, except that blending amounts of the carbon black and copper-phthalocyanine derivative were changed as shown in Table 7.

The weather resistance is evidently poor in comparison with that of Inventive Example 7.

Comparative Example 3

A black colored reinforced polyamide resin composition was obtained in the same manner as described in Inventive- Example 7, except that blending amounts of the carbon black and copper-phthalocyanine derivative were changed as shown in Table 7.

The surface gloss is evidently poor in comparison with that of Inventive Example 7.

Comparative Example 4

A black colored reinforced polyamide resin composition was obtained in the same manner as described in Inventive Example 7, except that the copper-phthalocyanine derivative was not used.

Comparative Example 7

A black colored reinforced polyamide resin composition was obtained in the same manner as described in Inventive Example 7, except that nigrosine (Sprit Black SB, manufactured by Orient Chemical) was used instead of the copper-phthalocyanine derivative.

The weather resistance is evidently poor in comparison with that of Inventive Example 7.

TABLE 7

| Comparative Example | 1 | 2 | 3 | 4 | 5 | 6 | 7 |
|---|---|---|---|---|---|---|---|
| (A) Polyamide resin | a1 | a1 | a1 | a1 | a1 | a1 | a1 |
| Anount (parts by weight) | 100 | 40 | 40 | 40 | 40 | 40 | 40 |
| Crystallization temperature (° C.) | 195 | 195 | 195 | 195 | 195 | 195 | 195 |
| (B) Inorganic filler | — | b2 | b2 | b2 | b2 | b2 | b2 |
| Amount (parts by weight) | — | 60 | 60 | 60 | 60 | 60 | 60 |
| Average glass fiber diameter ($\mu$m) | — | 23 | 23 | 23 | 23 | 23 | 23 |
| (C) Carbon black | c1 | c1 | c1 | c1 | c1 | c1 | c1 |
| Amount (parts by wt. per (A) + (B)) | 0.6 | 0.01 | 15 | 0.6 | 0.6 | 0.6 | 0.6 |
| (D) Copper-phthalocyanine derivative | d1 | d1 | d1 | — | d1 | d3 | nigrosine |
| Amount (parts by wt. Per (C)) | 20 | 20 | 20 | — | 1000 | 20 | 20 |
| Amount (parts by wt. Per (B)) | — | 0.003 | 5 | — | 10 | 0.2 | 0.2 |
| Copper compound: CuI | | | | | | | |
| Amount (ppm per polyamide) | — | — | — | — | — | — | — |
| Halogen/Cu (molar ratio) | — | — | — | — | — | — | — |
| (E) Phosphite compound | — | — | — | — | — | — | — |
| Amount (ppm per polyamide) | — | — | — | — | — | — | — |
| Tensile elongation (%) | 20 | 5 | 3 | 5 | 5 | 5 | 5 |
| Flexural modulus at the time of water absorption (kg/cm2) | 16000 | 130000 | 100000 | 130000 | 20000 | 130000 | 130000 |
| Surface gloss (mold temperature, 90° C.) | 90 | 85 | 50 | 50 | 70 | 50 | 83 |
| Surface gloss (mold temperature, 120° C.) | 90 | 85 | 50 | 50 | 70 | 50 | 83 |
| Weather resistance (gloss retention %) | 80 | 30 | 65 | 65 | 45 | 65 | 20 |
| Weather resistance ($\Delta$E) | 3 | 15 | 5 | 5 | 15 | 5 | 18 |

The surface gloss is evidently poor in comparison with that of Inventive Example 7.

Comparative Example 5

A black colored reinforced polyamide resin composition was obtained in the same manner as described in Inventive Example 7, except that blending amount of the copper-phthalocyanine derivative was changed to 1,000 parts by weight based on 100 parts by weight of the carbon black.

The weather resistance is evidently poor in comparison with that of Inventive Example 7.

Comparative Example 6

A black colored reinforced polyamide resin composition was obtained in the same manner as described in Inventive Example 7, except that d3 was used as the copper-phthalocyanine derivative.

The surface gloss is evidently poor in comparison with that of Inventive Example 7.

Comparative Example 8

A black colored reinforced polyamide resin composition was obtained in the same manner as described in Inventive Example 18, except that blending amount of the phosphite compound was changed to 20,000 ppm based on the polyamide.

The surface gloss is evidently poor in comparison with that of Inventive Example 18.

Comparative Example 9

A black colored reinforced polyamide resin composition having the composition shown in Table 8 was obtained in the same manner as described in Comparative Example 1, except that a5 was used as the polyamide.

The flexural modulus at the time of water absorption is evidently poor in comparison with Inventive Examples 31 to 35.

Comparative Example 10

A black colored reinforced polyamide resin composition was obtained in the same manner as described in Inventive Example 33, except that blending amounts of the carbon black and copper-phthalocyanine were changed to the amounts shown in Table 8.

The weather resistance is evidently poor in comparison with that of Inventive Example 33.

Comparative Example 11

A black colored reinforced polyamide resin composition was obtained in the same manner as described in Inventive Example 28, except that blending amounts of the carbon black and copper-phthalocyanine were changed to the amounts shown in Table 8.

Comparative Example 14

A black colored reinforced polyamide resin composition was obtained in the same manner as described in Inventive Example 31, except that blending amount of the phosphite compound was changed to 20,000 ppm based on the polyamide.

The surface gloss is evidently poor in comparison with Inventive Example 31.

TABLE 8

| Comparative Example | 8 | 9 | 10 | 11 | 12 | 13 | 14 |
|---|---|---|---|---|---|---|---|
| (A) Polyamide resin | a1, a5 | a5 | a5 | a3 | a4 | a4 | a5 |
| Amount (parts by weight) | 35.7, 4.3 | 100 | 67 | 50 | 67 | 67 | 50 |
| Crystallization temperature (° C.) | 195 | 180 | 180 | 205 | 225 | 225 | 180 |
| (B) Inorganic filler | b2 | — | b1 | b1 | b1 | b1 | b1 |
| Amount (parts by weight) | 60 | — | 33 | 50 | 33 | 33 | 50 |
| Average glass fiber diameter ($\mu$m) | 23 | — | 10 | 10 | 10 | 10 | 10 |
| (C) Carbon black | c1 | c1 | c1 | c1 | c1 | c1 | c1 |
| Amount (parts by wt. per (A) + (B)) | 0.6 | 0.6 | 0.01 | 15 | 0.6 | 0.6 | 0.6 |
| (D) Copper-phthalocyanine derivative | d1 | d1 | d1 | d1 | — | d3 | d1 |
| Amount (parts by wt. Per (C)) | 20 | 20 | 20 | 20 | — | 20 | 20 |
| Amount (parts by wt. Per (B)) | 0.2 | — | 0.006 | 6 | — | 0.36 | 0.24 |
| Copper compound: CuI Amount (ppm per polyamide) | — | — | — | — | — | — | — |
| Halogen/Cu (molar ratio) | — | — | — | — | — | — | — |
| (E) Phosphite compound | e1 | — | — | — | — | — | e1 |
| Amount (ppm per polyamide) | 20000 | — | — | — | — | — | 20000 |
| Tensile elongation (%) | 5 | >100 | 6 | 2 | 6 | 6 | 5 |
| Flexural modulus at the time of water absorption (kg/cm2) | 130000 | 13000 | 55000 | 150000 | 60000 | 60000 | 90000 |
| Surface gloss (mold temperature, 90° C.) | 65 | 90 | 70 | 35 | 50 | 50 | 65 |
| Surface gloss (mold temperature, 120° C.) | 65 | 90 | 75 | 65 | 50 | 50 | 65 |
| Weather resistance (gloss retention %) | 55 | 80 | 40 | 55 | 50 | 50 | 55 |
| Weather resistance ($\Delta$E) | 8 | 5 | 13 | 8 | 8 | 8 | 8 |

The surface gloss is evidently poor in comparison with that of Inventive Example 28.

Comparative Example 12

A black colored reinforced polyamide resin composition was obtained in the same manner as described in Inventive Example 36, except that the copper-phthalocyanine was not used.

The surface gloss is evidently poor in comparison with that of Inventive Example 36.

Comparative Example 13

A black colored reinforced polyamide resin composition was obtained in the same manner as described in Inventive Example 36, except that d3 was used as the copper-phthalocyanine derivative.

The surface gloss is evidently poor in comparison with that of Inventive Example 36.

Thus, as has been described in the foregoing, the black colored reinforced polyamide composition of the present invention has excellent mechanical properties, molding articles appearances and weather resistance in comparison with the prior art counterparts, and particularly shows high fading resistance and gloss retention under working conditions including rain when applied to various parts which are made of metals in the prior art, including automobile exterior parts such as outer door handles, wheel caps, roof rails, door mirror bases, room mirror arms, sunroof deflectors, radiator fans and bearing retainers, so that it can be used suitably in the broad range of industrial fields.

While the invention has been described in detail and with reference to specific exaitples thereof, it will be apparent to one skilled in the art that various changes and modifications can be made therein without departing from the spirit and scope thereof.

What is claimed is:

1. A black colored reinforced polyamide resin composition consisting essentially of the following components (A) to (D):
   (A) a polyamide comprising:
   (a1) from 85–100% by weight of a semiaromatic polyamide having a crystallization temperature of not higher than 210° C. and containing an aromatic ring in its monomer constituting unit; and (a2) from 0 to 15% by weight of an aliphatic polyamide having a crystallization temperature of not higher than 210° C.;

(B) at least one inorganic filler selected from the group consisting of glass fiber, mica, talc, kaolin and wollastonite;

(C) a carbon black; and (D) at least one copper-phthalocyanine derivative represented by the following formula (I) and (II):

wherein CuPc represents a copper-phthalocyanine residue, X represents —CH$_2$—, —CH$_2$—CH$_2$—COO—C$_2$H$_4$— or —CH$_2$—CH$_2$—COO—C$_3$H$_6$—, R$_1$, R$_2$ and R$_3$ each independently represents a hydrogen atom, an unsubstituted alkyl group, a substituted alkyl group, a cycloalkyl group, an alkylaryl group, an aryl group, an alkoxyalkyl group or a heterocyclic residue, R$_4$ represents an alkylaryl group, an aryl group, an alkoxyalkyl group or a heterocyclic residue, wherein R$_1$ and R$_2$ or R$_3$ and R$_4$ may be bonded to each other to form a substituted or unsubstituted heterocyclic ring, and n is from 1 to 4 on the average, wherein the composition contains: from 30 to 70 parts by weight of (A); from 70 to 30 parts by weight of (B); from 0.05 to 10 parts by weight of (C) based on 100 parts by weight of the total weight of (A) and (B); and from 5 to 100 parts by weight of (D) based on 100 parts by weight of (C).

2. The black colored reinforced polyamide resin composition according to claim 1, wherein the blending amount of the copper-phthalocyanine derivative(D) is from 0.1 to 8 parts by weight based on 100 parts by weight of the inorganic filler (B).

3. The black colored reinforced polyamide resin composition according to claim 1, wherein the polyamide (a1) which is a semi-aromatic polyamide comprises:

from 70 to 95% by weight of a hexamethylene adipamide unit obtained from adipic acid and hexamethylenediamine; and from 5 to 30% by weight of a hexamethylene isophthalamide unit obtained from isophthalic acid and hexamethylenediamine.

4. The black colored reinforced polyamide resin composition according to claim 1, wherein component (B) is glass fiber having an average fiber diameter of from 15 to 30 μm.

5. The black colored reinforced polyamide resin composition according to claim 1, further containing at least one of:

a copper compund other than the copper-phthalocyanine derivative in an amount of from 10 to 1,000 ppm in terms of copper atoms; and a phosphite comrpound in an amount of from 10 to 10,000 ppm, each based on the polyamide (A).

6. The black colored reinforced polyamide resin composition according to claim 1, wherein polyamide (A) is selected from the group consisting of a nylon obtained by polymerizing hexamethylenediamine with isophthalic acid, a nylon obtained by polymerizing isophthalic acid with bis(3-methyl-4-aminocyclohexyl)methane, a nylon obtained by polymerizing adipic acid with isophthalic acid and hexamethylenediamine, a nylon obtained by polymerizing adipic acid with terephthalic acid and hexamethylenediamine, a nylon obtained by polymerizing isophthalic acid with terephthalic acid and hexamethylenediamine, a nylon obtained by polymerizing terephthalic acid with 2,2,4,-trimethylhexamethylenediamine and 2,4,4-trimethylhexamethylenediamine, a nylon obtained by polymerizing isophthalic acid with terephthalic acid, hexamethylenediamine and bis(3-methyl-4-aminocyclohexyl)methane, a mixture of a nylon obtained by polymerizing isophthalic acid with terephthalic acid, hexamethylenediamine and bis(3-methyl-4-aminocyclohexyl) methane with nylon 6 and a mixture of MXD6 nylon with nylon 66.

7. The black colored reinforced polyamide resin composition according to claim 1, wherein polyamide (a2) is a polyamide 6, polyamide 610, polyamide 11, polyamide 12, polyamide 66/6, or a blend thereof.

8. The black colored reinforced polyamide resin composition according to claim 1, wherein the sulfuric acid solution viscosity μr of the polyamide is from 1.5 to 3.5.

9. The black colored reinforced polyamide resin composition according to claim 1, wherein the carbon black is thermal black, channel black, acetylene black, ketjen black or furnace black.

10. The black colored reinforced polyamide resin composition according to claim 9, wherein the carbon black is in an amount of 0.05 to 10 parts by weight.

11. The black colored reinforced polyamide resin composition according to claim 1, wherein the copper phthalocyanine derivative is an (alkyl)phthalimidemethyl copper-phthalocyanine, a dialkylaminomethyl copper-phthalocyanine, an (alkyl)anilinosulfamoyl copper-phthalocyanine or a dialkylaminopropylsulfonamide copper-phthalocyanine.

* * * * *